United States Patent [19]
Reuter

[11] Patent Number: 4,984,952
[45] Date of Patent: Jan. 15, 1991

[54] CHARGING APPLIANCE FOR MELTING UNITS

[75] Inventor: Wolfgang Reuter, Niddatal, Fed. Rep. of Germany

[73] Assignee: Leybold Aktiengesellschaft, Fed. Rep. of Germany

[21] Appl. No.: 387,589

[22] Filed: Jul. 31, 1989

[30] Foreign Application Priority Data

Mar. 14, 1989 [DE] Fed. Rep. of Germany ....... 3908265

[51] Int. Cl.⁵ ............ B65G 25/08

[52] U.S. Cl. ............ 414/180; 414/154; 414/188; 414/198

[58] Field of Search ............ 414/154, 156, 160, 167, 414/171, 172, 180, 181, 182, 187, 188, 192, 198; 198/486.1, 346.2, 791, 851; 254/265

[56] References Cited

U.S. PATENT DOCUMENTS 505,348 9/1893 Buchanan, Jr. ............ 414/181
879,839 2/1908 Sanderson ............ 414/198 X

FOREIGN PATENT DOCUMENTS 610323 3/1935 Fed. Rep. of Germany ...... 414/181
8617997 9/1986 Fed. Rep. of Germany .
671245 4/1952 United Kingdom ............ 414/182

OTHER PUBLICATIONS

Brochure M2.110D from Leybold-Heraeus, "Feritigen Hockreiner Und Extreme Belastbarer Bauelemente".

*Primary Examiner*—Robert J. Spar
*Assistant Examiner*—Scott L. Lowe
*Attorney, Agent, or Firm*—Hill, Van Santen, Steadman & Simpson

[57] ABSTRACT

A charging appliance for melting units that work under vacuum or under protective gas atmosphere includes a charging shovel, for holding charging stock, attached to a carriage which transports the charging stock to an advanced position inside the melting unit. The charging appliance further includes an ejector that holds the charging stock in the advanced position while the charging shovel is being retracted, resulting in the charging stock being deposited in the melting unit. The rolling carriage which transports the charging stock runs along a rail set. The rail set is movable via lifting cylinders. By selective displacement of two lifting cylinders, the elevation and angle of tilt of the rail set can be adjusted. Accordingly, the charging shovel can be maneuvered in a wide variation of positions inside the melting chamber. The charging appliance can be quickly and accurately adapted for use to a particular melting unit.

23 Claims, 3 Drawing Sheets

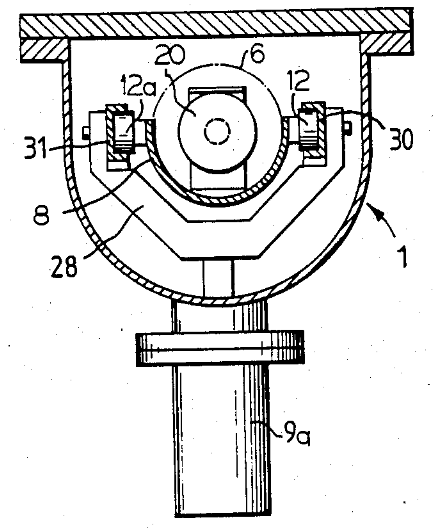
FIG.4
FIG.5
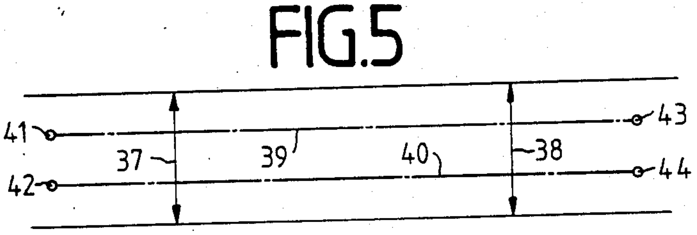
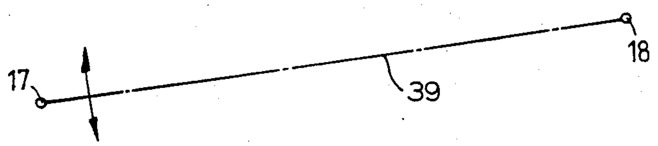
FIG.6
FIG.7

CHARGING APPLIANCE FOR MELTING UNITS

BACKGROUND OF THE INVENTION

The invention is directed to a charging appliance for melting units, particularly for melting units that operate under vacuum or under a protective gas atmosphere.

A variety of charging appliances are used in the metals industry and utilized for vacuum melting units, particularly for vacuum-induction-melting and fine-casting systems. Blocks to be charged or charging stock are generally conveyed into a melting unit, particularly into a crucible inside a melting chamber, through a feeding lock. Subsequently, the blocks are melted either under vacuum or under a protective gas atmosphere.

Such a vacuum-induction-melting and fine-casting system is described, for example, in a brochure M 2 110/d of the former Leybold Heraeus GmbH & Co. KG.

SUMMARY OF THE INVENTION

It is an object of the present invention to provide a charging appliance for melting units which: enables a far reaching and versatile maneuverability of an acceptance means, which deposits charging stock into a melting unit, even while under vacuum or protective gas atmosphere; works in a generally horizontally orientation; comprises a compact and precise means for discharging charging stock into the melting unit; and comprises a minimum overall length, measured outwardly from the melting unit.

In a charging appliance for melting units as initially described these objectives are accomplished in that:

the acceptance means for charging stock is displaced horizontally out of the charging appliance by a transportation means, such that the acceptance means and charging stock protrude into the melting unit; by using maneuvering devices, an initial longitudinal axis of the acceptance means can be selectively displaced vertically, or inclined or declined to the horizontal axis to adapt to particular discharge conditions; and because of a sealed configuration of the charging appliance these manipulations are possible while the charging appliance and the melting unit are under a vacuum or protective gas atmosphere during charging;

the transportation means, the acceptance means, and the maneuvering devices all facilitate a generally horizontal orientation and operation of the charging appliance;

the acceptance means and the charging stock are projected from inside the charging appliance to a precise unloading position, an advanced position, inside the melting unit, where an ejector means or stop mechanism remains at the advanced position while the acceptance means is retracted in a reverse direction from its initial projection, the ejector means thus preventing any retreat of the charging stock; when the acceptance means is withdrawn, the charging stock is unsupported and discharges at a precise location; the ejector means is guided by the transportation means along a longitudinal axis of travel of the transportation means, this feature obviates the need for a separate guide system, resulting in space savings; the ejector means is prevented from retreating with the acceptance means by a thrust chain assembly which is compact, rugged, and reliable;

the overall length of the charging appliance is minimized by the utilization of a thrust chain which takes up a length of retraction travel or backstroke of the stop mechanism and redirects this length or backstroke across a chain wheel from the longitudinal axis of the transportation means to a length at approximately 90° from the longitudinal axis of travel of the transportation means, resulting in a reduced overall length of the charging appliance.

BRIEF DESCRIPTION OF THE DRAWINGS

FIG. 4 is a sectional view along the section line IV—IV of FIG. 3.

FIG. 5, 6 and 7 are schematic views showing possible positions or movements of the conveyor means and, thus, of the acceptance means of the charging appliance according to the preceding figures.

DESCRIPTION OF THE PREFERRED EMBODIMENTS

Figure 1:
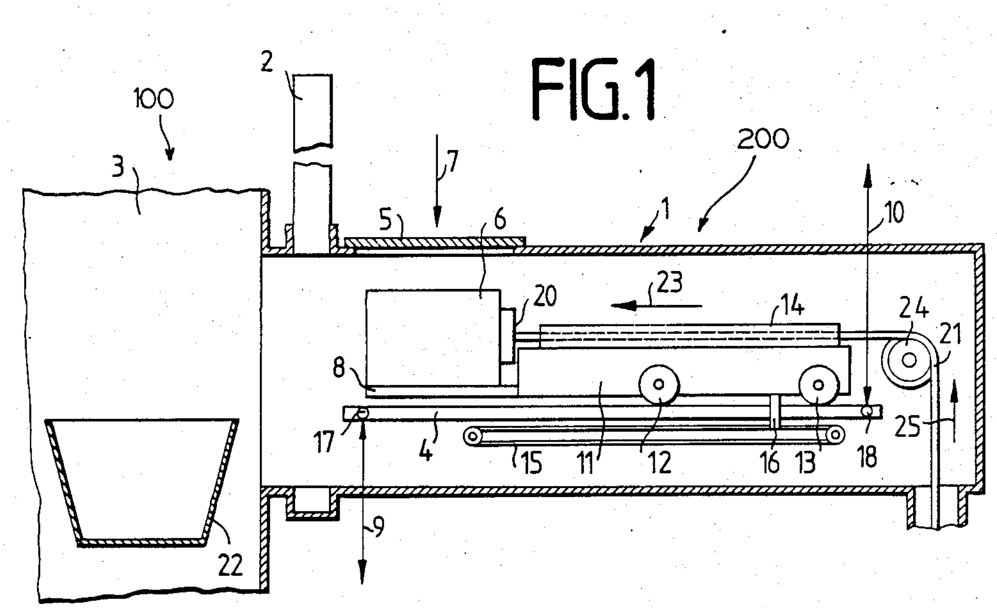
FIG. 1 is a schematic view showing a horizontally arranged charging appliance, whereby the appliance is in a loading position.
Figure 2:
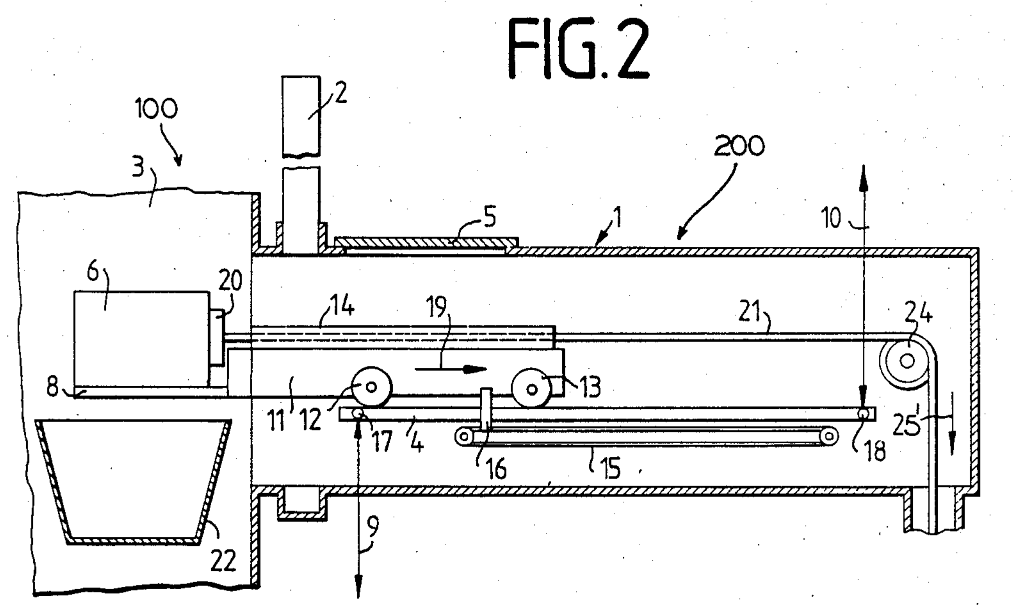
FIG. 2 is a schematic view showing the appliance of FIG. 1, whereby the carriage is in a position shortly before the ejection of charging stock.

FIG. 1 and 2 show a melting unit generally at 100 and a charging appliance generally at 200. FIGS. 1 and 2 also describe the operation of the charging appliance 200. FIG. 1 shows an initial position or a first position of the charging appliance. FIG. 2 shows an advanced position or second position of the charging appliance.

A structure of a horizontally arranged charging appliance is shown in FIGS. 1 and 2. A vacuum tight housing 1 is connected via a lock valve 2 to a melting chamber 3 residing under vacuum. The housing 1 is provided with a cover 5. After isolating the housing 1 from the melting chamber 3, residing under vacuum, by closing lock valve 2, after flooding the housing 1 and after opening the cover 5, charging stock 6 or in the present case a cylindrical block 6, is placed onto a charging shovel 8. A loading direction is indicated by an arrow 7 in FIG. 1.

A movable rail set 4 is situated inside the housing 1. The rail set 4 is arranged movable by lifting devices or maneuvering devices. The lifting devices or maneuvering devices are symbolically shown in FIG. 1 and 2 with double arrows 9, 10. The preferred embodiment of the lifting devices are hydraulic lifting cylinders **9*a*, 10*a* (shown in FIG. 3**).

In an alternate embodiment (not shown), manually actuatable spindles, or electrical lifting units, or pneumatic lifting units can be used in lieu of the hydraulically actuated lifting cylinders **9*a*, 10*a***. Eccentrics and lever articulations can also be employed.

A carriage 11 comprising four wheels or rollers 12, 13, **12*a*, 13*a* runs on the rail set 4. Two wheels or rollers 12, 13 mounted on a near side of the carriage 11 are shown in FIG. 1 and 2. Similarly, two additional wheels 12*a*, 13*a* (13*a* not shown, 12*a* shown in FIG. 4) are mounted on a far side of carriage 11. The rail set 4 comprises two rails 30, 31 each having a C-shaped profile (not shown in FIG. 1 or 2, but shown in FIG. 4). The wheels or rollers 12, 12*a*, 13, 13*a* of the carriage 11** run inside the C-shaped profiles.

FIG. 1 and 2 show an ejector 20 seated at a front end of the carriage 11. An ejector guiding apparatus 14 is symbolically shown as part of carriage 11. The charging shovel 8 is also situated at the front end of the carriage 11; it is rigidly joined to the carriage such as by screws. The carriage 11 and the ejector 20 are transported by a circulating chain drive 15. A dog 16 couples the chain drive 15 and carriage 11. Movement of the chain 15 displaces the dog 16 which displaces the carriage 11, which displaces the ejector 20.

The lifting cylinders 9, 10 mount to the rail set 4 at points 17, 18. The rail set 4 can thus be displaced vertically and/or inclined to the horizontal by selective displacement of each lifting cylinder 9, 10. This results in corresponding tilts or vertical displacements of the charging shovel 8, particularly in the advanced position (shown in FIG. 2). These different tilts or this vertical displacement of the charging shovel are symbolically shown in FIGS. 5, 6 and 7 described later in this specification.

After the block 6 is loaded and the cover 5 is closed, the housing 1 is evacuated, or put under a protective atmosphere. The lock valve 2 is opened. The carriage 11 and the ejector 20 are moved by the chain drive 15 out of the initial position according to FIG. 1, in a direction as shown by an arrow 23, into the advanced position, shown in FIG. 2. A thrust chain 21 is thereby loosely entrained. In the advanced position the block 6 is situated in the melting chamber 3.

To unload the charging shovel 8 and to deposit the block 6 into the melting chamber 3 the carriage 11 is retracted, in a direction as shown by an arrow 19, by the chain drive 15. The ejector 20 remains in the advanced position shown in FIG. 2. The ejector 20 is held in the advanced position by the thrust chain 21 which can transmit thrusting or compression forces as a result of its structural design (shown in FIG. 8), and which is itself blocked by a chain wheel 24 which is itself blocked by a blocked free wheel or braking means (not shown). When the carriage 11 is retracted, the ejector 20 serves to stop retraction of the block 6. Support from the shovel 8 is removed from under the block 6. The block 6 deposits into the melting chamber 3 or more particularly into a melting area or crucible 22.

In detail, the thrust chain 21 operates according to the following description. The thrust chain 21 is engaged to the chain wheel 24. The chain wheel 24 is provided with means to prevent the thrust chain 21 from disengaging when the thrust chain is subjected to a thrusting force during retraction of the carriage 11. Such a means can be an outer backing plate (not shown) wherein the thrust chain 21 is situated in a closely spaced fashion between the chain wheel 24 and the backing plate, thus the backing plate would receive the thrusting force from the thrust chain 21 and prevent the thrust chain from moving away from the chain wheel 24 and thus disengaging. The chain wheel 24 is provided with a free wheel or braking means (not shown). During movement of the chain in a direction shown by an arrow 25 (FIG. 1), the chain wheel 24 rotates freely. The ejector 20, the thrust chain 21 and the carriage 11 are moved into the advanced position of FIG. 2 by the chain drive 15. Given the return movement of the carriage according to arrow 19 of FIG. 2, the free wheel or braking means of the chain wheel 24 prohibits the movement of the thrust chain in a direction as shown by an arrow 25′ (FIG. 2), so that the thrust chain 21 and the ejector 20, connected to the thrust chain 21, remain in the advanced position shown in FIG. 2.

The free wheel or braking means of the chain wheel 24 is releasable, and is released when the charging shovel 8 is to be loaded with a new block 6. The braking means of the chain wheel 24 can be of various designs. A ratchet and pawl device can be employed wherein the pawl engages teeth of the ratchet to prevent rotation in one rotation direction but permits free-wheeling in an opposite rotation direction. Thus, the ratchet and pawl would permit free-wheeling rotation of chain wheel 24 in a rotation direction which would permit the thrust chain 21 to be transported to the advanced position; but would prevent a reverse rotation, which would prevent the thrust chain from retracting with the carriage 11. The pawl would then be released to permit rotation of the chain wheel 24 in a rotation direction which permits retraction of the thrust chain 21. Other braking devices known to the art could be employed as well. Once chain wheel 24 is released and free-wheeling, the thrust chain 21 can be retracted in a direction of the arrow 25′. A motive force is required to retract the thrust chain 21 once the braking means has been released. Such a motive force can be a weight (not shown) suspended from a rear portion or backstroke portion of the thrust chain and situated inside a cylindrical compartment 27. Once chain wheel 24 is free-wheeling, such a weight would exert a force on the thrust chain 21 causing it to retract to the initial position shown in FIG. 1. Other means known to the art of providing motive force to retract the thrust chain could be employed.

The thrust chain 21 and chain wheel 24 provide a suitable means for exerting a pushing force on the charging stock or block 6 during retraction of the carriage 11. The structural design of the thrust chain 21 accomodates thrust or compression forces and the thrust chain 21 is adequately guided to prevent buckling during retraction of the carriage 11. Also, flexible properties of the thrust chain 21 as opposed to a rigid type push member, permit a rear portion or backstroke portion of the chain 21 to be engaged around the chain wheel 24 and extend at an angle approximately 90° from the longitudinal axis of the carriage 11, into the cylindrical compartment 27. Thus, an overall length of the charging appliance 200, measured in a direction outward from the melting unit 100 is minimized. Although approximately 90° provides a minimum overall length, a variety of angles could be employed.

After the ejector 20 is retracted, the charging appliance can be reloaded with a new block 6 as previously described.

Figure 3:
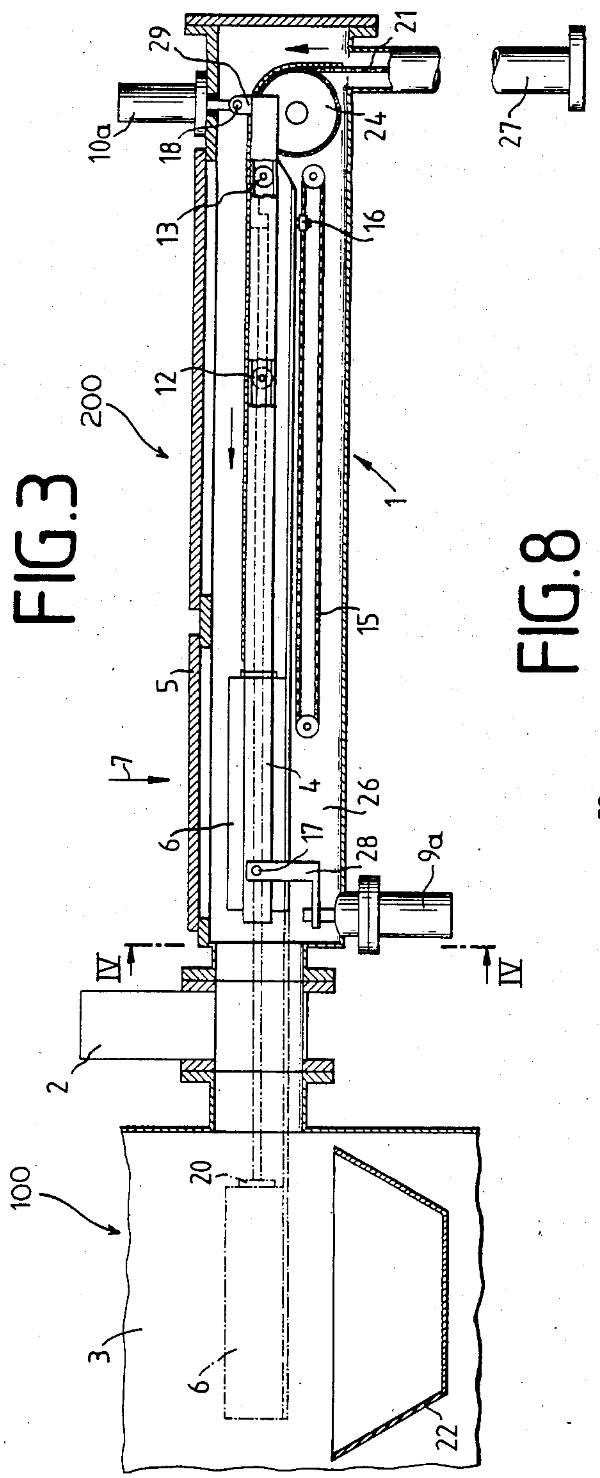
FIG. 3 shows the appliance of FIG. 1 and 2 in an assembly drawing.

FIG. 3 shows structural details of the charging appliance 200. As indicated in FIG. 4, the housing is fashioned trough-like in region 26. The cylindrical compartment 27, for the acceptance of the thrust chain 21, is connected to the housing 1. The housing 1 is mounted to a lock valve 2 which is mounted to the melting unit 100. Lifting cylinders 9*a* and 10*a* are mounted to the housing 1.

The rail set 4 is pinned or hinged to an acceptance element 28 at point 17 and to a connecting element 29 at point 18. The acceptance element 28 is located near a front end of the rail set 4. The acceptance element 28 is moved by the lifting cylinder 9*a* which is mounted to the housing 1. The rail set 4 is pinned or hinged to the connecting element 29 near a back end of the rail set 4.

The rail set 4 can thus be displaced vertically and/or pivoted by the lifting cylinders 9*a* and 10*a*. For vertical parallel displacement, the lifting cylinders *9a* and *10a* are appropriately controlled, i.e. the points 17 and 18 are lifted or lowered by the same distance.

On the other hand, either point 17 or 18 can serve as a fixed point while the respective other point 17 or 18 is being moved. This causes a pivoting of the rail set 4. A vertical parallel displacement and a pivoting can also be additively carried out. It follows that the rail set 4 and thus the charging shovel 8 can be maneuvered over a broad range of positions, especially in the advanced position.

In a section along the section line IV—IV of FIG. 3, FIG. 4 shows the trough-like housing 1 and the lifting cylinder *9a*. The acceptance element 28 accepts two rails 30, 31 comprising C-shaped profiles. The wheels or rollers 12, 12a of the carriage 11 run inside the C-shaped profiles. The profile of the charging shovel 8 is likewise trough-shaped to accept the cylindrical block 6. Ejector 20 and the contours of the cylindrical block 6, are also shown.

As set forth in detail above, FIG. 5 shows that the charging shovel 8 can be moved upward or downward parallel to an initial position in the direction of arrows 37, 38 on the basis of an appropriate control of the lifting cylinders *9a*, *10a*. Two possible positions of a longitudinal axis of the rail set 4, determines the position of the charging shovel 8, are schematically shown by the dot-dash lines 39, 40. Location points 41, 42 thereby correspond to the point 17 of FIG. 3. Location points 43, 44 correspond to the point 18 of FIG. 3.

FIG. 6 shows how the displacement of the point 17 causes the rail set longitudinal axis 39 to pivot around the point 18.

Similarly, FIG. 7 shows how displacement of the point 18 causes the rail set longitudinal axis 39 to pivot around the point 17.

Figure 8:
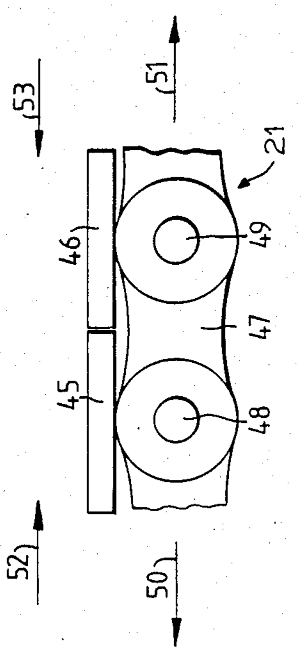
FIG. 8 is a partial elevational view showing elements of the thrust chain

A structure of the thrust chain 21 is shown in FIG. 8. In a side view, FIG. 8 shows the thrust chain 21 is provided with top plates 45, 46 mounted on a chain side opposite to an engagement side of the thrust chain 21 which engages the chain wheel 24. The top plates 45, 46 can be attached by welding or brackets. The thrust chain 21 is comprised of a plurality of link plates 47, each having a hole at each end. The link plates 47 are aligned in an end to end fashion in two closely spaced apart rows. Axles or chain studs 48, 49 connect each link plate 47 to each adjacent link plate 47 and to opposing and identical link plates 47 (not shown). The chain studs 48, 49 also can hold rollers onto the thrust chain 21 (not shown). The thrust chain 21 can thus fulfill both a common function of a chain, transmission of tractive forces, and can also transmit pressure forces or compressive forces along the length of the thrust chain 21. Tractive forces that are symbolized by arrows 50, 51 are transmitted by the link plates 47 of the thrust chain 21. Compressive forces are illustrated by arrows 52, 53 and are transmitted by the tightly adjacent top plates 45, 46.

Further exemplary embodiments are also conceivable for realizing the basic idea of the thrust chain 21. Thus, the thrust chain 21 can be replaced by any other power transmission element that can serve both as a tensile element as well as a thrust element.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonable and properly come within the scope of my contribution to the art.

I claim as my invention:

1. A charging appliance for depositing charging stock into a chamber comprising:
   - a housing affixable to the chamber, said housing having an interior thereof openable to an interior of the chamber;
   - an acceptance means for receiving charging stock and for transporting charging stock from a first position interior to said housing to a second position interior of the chamber said acceptance means providing a support surface of the charging stock;
   - a stock mechanism, said stop mechanism mounted for movement with said acceptance means from the first position to the second position, said stop mechanism independently movable with respect to said acceptance means, said stop mechanism positioned on a side of said charging stock trailing the charging stock as the charging stock travels from the first position to the second position, said acceptance means retractable from the second position towards the first position while said stop mechanism is releasably mechanically locked with respect to said housing in an advanced position adjacent to the second position of said charging stock; whereby the support surface is withdrawn from under the charging stock by retracting said acceptance means toward the first position while restraining retraction movement of the charging stock toward the first position by abutting the charging stock against said releasably mechanically locked stop mechanism; and
   - a motive means for retracting said stop mechanism, once mechanically released, to a base portion interior to said housing on a side of the support surface remote from the chamber.

2. A charging appliance according to claim 1 further comprising a conveyor means, said acceptance means movably mounted to said conveyor means, and said conveyor means supporting said acceptance means, and guiding the travel of said acceptance means, allowing said acceptance means freedom to move in a direction from the first position towards the second position and from the second position towards the first position.

3. A charging appliance according to claim 2, further comprising at lest one controlled maneuvering device wherein said maneuvering device is mounted to said conveyor means and said maneuvering device acts to position said conveyor means at selected elevations.

4. A charging appliance according to claim 2 further comprising at least one controlled maneuvering device wherein said maneuvering device is mounted to said conveyor means and said maneuvering device acts to control elevation and tilt angle of said acceptance means by positioning said conveyor means at selectable elevations and selectable angles of tilt.

5. A charging appliance for depositing charging stock in a chamber comprising:
   - a housing affixable to said chamber, said housing having an interior thereof openable to an interior of the chamber;
   - an acceptance means for receiving charging stock and for transporting charging stock from a first position interior to said housing to a second position interior of the chamber, said acceptance means providing a support surface for the charging stock, said acceptance means comprising:

a carriage comprising a plurality of wheels, and wheels rotatably mounted to said carriage, and supporting said carriage, and a drive means, said drive means engaging said carriage and providing a motive force for transporting said carriage;

a stop mechanism means, said stop mechanism means for exerting a lateral force on said charging stock to displace said charging stock from said acceptance means;

a rail set having a plurality of rails, said wheels guided by and supported by said rails allowing said acceptance means freedom to move in a direction from the first position toward the second position and from the second position toward the first position;

at least one controlled maneuvering device wherein said maneuvering device is mounted to said rail set and said maneuvering device acts to position said rail set at selectable elevations and also acts to set said rail set at selectable angles of tilt.

6. A charging appliance according to claim 5 wherein said stop mechanism means comprises:

an ejector; said ejector positioned on a side of said charging stock trailing the charging stock as the stock travels from the first position to the second position, said ejector mounted for movement with said acceptance means from the first position to the second position and abutting the charging stock during retraction of said acceptance means;

a motive means for retracting said ejector from an advanced position adjacent to the second position of said charging stock, to a retracted position adjacent to the first position of the charging stock;

a thrust chain, said thrust chain connected at one end to said ejector and connected to said motive means, and said thrust chain movable with said ejector, said motive means engaging said thrust chain to retract said thrust chain and said ejector; and a selective stopping means for engaging said thrust chain and prohibiting movement of said thrust chain in a direction from the second position toward the first position, such that said ejector is prohibited from movement in a direction from the second position towards the first position by said thrust chain.

7. A charging appliance according to claim 6 wherein said selective stopping means comprises:

a chain wheel, said chain wheel engaging said thrust chain and rotatable with movement of said thrust chain; and a releasable braking means engaging said chain wheel which prevents said chain wheel from rotating, which prevents movement of said thrust chain.

8. A charging appliance according to claim 7 wherein said stop mechanism means is guided by said carriage.

9. A charging appliance according to claim 8 wherein at least one of said maneuvering devices comprise a hydraulically actuated piston-cylinder unit.

10. A charging appliance according to claim 8 wherein at least one of said maneuvering devices comprise an electrically actuated displacement unit.

11. A charging appliance according to claim 8 wherein at least one of said maneuvering devices comprise a pneumatically actuated piston cylinder unit.

12. A charging appliance according to claim 8 wherein at least one of said maneuvering devices comprise a manually controlled device.

13. A charging appliance according to claim 1 wherein said stop mechanism comprises:

an ejector, said ejector positioned on a side of said charging stock trailing the charging stock as the stock travels from the first position to the second position, said ejector abutting the charging stock during retraction of said acceptance means;

a thrust chain, said thrust chain connected at one end to said ejector and engaged to said motive means, and said thrust chain movable with said ejector, said motive means driving said thrust chain to retract said ejector; and a selective stopping means for releasably mechanically locking said stock mechanism by engaging said thrust chain and prohibiting movement of said thrust chain in a direction from the second position toward the first position, such that said ejector is prohibited from movement in a direction from the second position towards the first position by a pushing force from said thrust chain.

14. A charging appliance according to claim 13 wherein said stopping means comprises:

a chain wheel, said chain wheel engaging said thrust chain and rotatable with movement of said thrust chain; and a releasable braking means engaging said chain wheel which prevents said chain wheel from rotating, which prevents movement of said thrust chain.

15. A charging appliance according to claim 14 wherein said thrust chain further comprises:

a plurality of link plates arranged in two rows, each row facing a respectively second row in a closely spaced apart posture, said link plates each comprising two holes for fastening link plates together along each row in an end to end fashion and for connecting each row of said link plates to the respectively second row;

a plurality of chain studs, said chain studs acting to fasten said link plates together and to connect the two rows of said link plates together;

a plurality of top plates said top plates mounted on one side of said link plates in an end to end fashion each said top plate in a closely spaced posture to each adjacent said top plate.

16. A charging appliance for depositing charging stock into a chamber comprising:

a housing having a sealed integrity;

a lock valve affixed on one side to an open end of said housing and affixed on another side to said chamber, said housing having an interior thereof openable to an interior of said lock valve, said lock valve having an interior thereof openable to an interior of said chamber, said housing and said lock valve maintaining a sealed integrity together and to the chamber;

a charging shovel for holding charging stock, said charging shovel comprising a support surface whereon resides the charging stock;

a transportation means connected to said charging shovel, said transportation means for transporting said charging shovel and the charging stock from a first position interior of said housing through said lock valve and to a second interior of the chamber;

a stop mechanism mounted for movement with said charging shovel from the first position to the second position, said stop mechanism independently movable with respect to said charging shovel, said stop mechanism positioned trailing the charging stock as the stock travels from the first position to the second position, said charging shovel retractable from the second position towards the first position with said stop mechanism releasably mechanically locked with respect to said housing in an advanced position adjacent to the second position of said charging stock whereby the support surface is withdrawn from under the charging stock by retracting said charging shovel while restraining retraction movement of the charging stock towards the first position by abutting the charging stock against said stop mechanism; and a motive means for withdrawing said stop mechanism, once released, to a base position interior of said housing, to a side of the support surface remote from the chamber.

17. A charging appliance according to claim 16 wherein said transportation means comprises:

a carriage comprising four wheels, said wheels rotatably mounted to said carriage and supporting said carriage, said carriage connected to said charging shovel;

a rail set comprising two rails, said wheels guided and supported by said rails;

two hydraulic lifting devices, one acting as a front end of said rail set and one acting at a back end of said rail set, said hydraulic lifting devices acting to selectively position an elevation and an angle of tilt of said rail set;

a chain drive means, said drive means engaging said carriage and providing motive force for transporting said carriage and said stop mechanism.

18. A charging appliance according to claim 17 wherein said stop mechanism comprises:

an ejector, positioned trailing the charging stock as the charging stock travels from the first position to the second position, and abutting the charging stock during retraction of said charging shovel from the second position towards the first position;

a thrust chain connected to one end of said ejector, and connected near another end of said motive means;

a chain wheel with a releasable braking means said chain wheel engaging said thrust chain and rotatable with movement of said thrust chain in a direction from the first position towards the second position until the charging stock is in the second position, wherein said braking means of said chain wheel selectively prevents a reverse rotation of said chain wheel and thus prevents retraction of said thrust chain as said charging shovel is being retracted from the second position towards the first position.

19. A charging appliance according to chain 18 wherein said housing comprises:

a trough shaped shell which maintains the sealed integrity;

an access door in said shell for placing charging stock on said charging shovel;

a cylindrical container mounted to said shell for holding backstroke chain length of said thrust chain when said stop mechanism is retracted to the base position.

20. A charging appliance according to claim 15 further comprising a conveyor means, said acceptance means movably mounted to said conveyor means, and said conveyor means supporting said acceptance means, allowing said acceptance means freedom to move in a direction from the first position towards the second position and from the second position toward the first position.

21. A charging appliance according to claim 20 further comprising at least one controlled maneuvering device wherein said maneuvering device is mounted to said conveyor means and said maneuvering device acts to position said conveyor means at selectable elevations and also acts to set said conveyor means at selectable angles of tilt.

22. A charging appliance according to claim 13, wherein the chamber comprises a vacuum melting chamber and said housing maintains a sealed integrity with the chamber during operation; and said housing further comprising a valve means for isolating said housing from said chamber and a door means to receiving stock into said housing during reload, received herein by said acceptance means.

23. A charging appliance according to claim 22, further comprising:

a conveyor means, said acceptance means movably mounted to said conveyor means, and said conveyor means supporting said acceptance means, allowing said acceptance means freedom to move in a direction from the first position toward the second position and from the second position toward the fist position; and at least one controlled maneuvering device wherein said maneuvering device is mounted to said conveyor means and said maneuvering device acts to position said conveyor means at selectable elevations and also acts to set said conveyor means at selectable angles of tilt.

* * * * *